US006836732B2

(12) United States Patent
Tiberi

(10) Patent No.: US 6,836,732 B2
(45) **Date of Patent: *Dec. 28, 2004**

(54) ENHANCED VAPOR CONTAINMENT AND MONITORING

(75) Inventor: Tedmund P. Tiberi, Brookfield, IL (US)

(73) Assignee: Arid Technologies, Inc., Lagrange, IL (US)

( * ) Notice: Subject to any disclaimer, the term of this patent is extended or adjusted under 35 U.S.C. 154(b) by 58 days.

This patent is subject to a terminal disclaimer.

(21) Appl. No.: 10/180,238

(22) Filed: Jun. 26, 2002

(65) Prior Publication Data

US 2004/0002834 A1 Jan. 1, 2004

(51) Int. Cl.[7] .................................................. G01N 31/00

(52) U.S. Cl. ............................. 702/24; 702/24; 702/31; 702/32; 702/84; 73/24.04; 73/25.04; 73/29.01; 73/61.77; 324/464; 324/89; 141/7; 141/44; 141/59; 141/290

(58) Field of Search .............................. 702/22, 24, 31, 702/32, 84, 81, 98, 99, 104, 116, 122, 140, 183, FOR 115, 128, 141–143, 155; 73/24.04, 29, 25.04, 29.01, 61.77; 324/464, 89, 462; 141/7–8, 44, 59, 83, 290

(56) References Cited

U.S. PATENT DOCUMENTS 3,918,932 A * 11/1975 Lee et al. ....................... 95/14
5,803,136 A * 9/1998 Hartsell, Jr. .................... 141/7
5,843,212 A * 12/1998 Nanaji .............................. 96/4
6,460,579 B2 10/2002 Nanaji
6,622,757 B2 * 9/2003 Hart et al. ...................... 141/7
2002/0049549 A1 * 4/2002 Rogers et al. ................ 702/50
2003/0057954 A1 * 3/2003 Grantham et al. .......... 324/464

OTHER PUBLICATIONS

Koch et al., "What Does Field Testing Show for Assist Vapor Recovery System?", Oct. 1999, PET, pp. 25–29.*

Liu et al., "Gain–Scheduled Control Design Using the Loop Transfer Recovery Method for Vapor Compression Systems", Jun. 1997, AACC, pp. 3326–3330.*

Koch, "Development Technology for Ehhanced Vapor Recovery, Part 1, Vent Processors" Feb./Mar. 2001, PET, pp. 16–22.*

Wood et al., Case tools and interactive process modeling accelerate the software development cycle for refined petroleum storage tank vapor recovery, IEEE Journal, Jan. 1992, 39th Annual, pp. 265–270.

* cited by examiner

*Primary Examiner*—Marc S. Hoff
*Assistant Examiner*—Elias Desta
(74) *Attorney, Agent, or Firm*—Skadden, Arps, Slate, Meagher & Flom LLP

(57) ABSTRACT

An apparatus and method for ensuring effective and efficient vehicle vapor recovery performance, storage tank system integrity relative to both vapor and liquid containment and for reducing the probability that inaccurate information causes companies to undertake unnecessary, expensive and wasteful loss investigations at gasoline dispensing facilities. A fuel storage and delivery system is transformed from an "open system" communicating directly with the environment to a "closed system" which ensures capture, containment and accurate accounting of both hydrocarbon vapors and liquid phase product.

14 Claims, 6 Drawing Sheets

ENHANCED VAPOR CONTAINMENT AND MONITORING

TECHNICAL FIELD

The present invention relates generally to the commercial distribution and sales of volatile motor fuels and more specifically to systems and methods for increasing overall vapor recovery efficiency and ensuring storage tank integrity at such volatile motor fuel dispensing facilities.

BACKGROUND OF THE INVENTION

Various stationary and mobile tanks are used in the production, storage and distribution of volatile organic compounds such as fuels, solvents and chemical feedstocks. When transferring a volatile fuel such as gasoline from a fixed roof storage tank to a fixed roof receiving tank, two events simultaneously occur. Vapors in the receiving tank ullage (space above the liquid) are displaced by the incoming liquid, and a negative pressure in the storage tank is developed in response to the dropping liquid level. The negative pressure in the storage tank is offset by either the ingestion of atmospheric air, or in the case of facilities equipped with Stage II vapor recovery systems, a hydrocarbon/air mixture. If the hydrocarbon concentration in the storage tank ullage is reduced below the naturally occurring equilibrium concentration dictated by the volatility and temperature of the fuel, a driving force for evaporation of valuable liquid gasoline is established. As the storage tank liquid evaporates to re-establish the equilibrium hydrocarbon concentration in the ullage space, the volume expansion of liquid to vapor measures approximately 520:1, and the resulting large volume of vapor is exhaled until equilibrium is achieved. These emissions are comprised of VOC's (Volatile Organic Compounds) which are ozone precursors and hazardous air pollutants (HAPS) such as benzene. These gasoline vapor emissions represent an economic loss to the retailer, an environmental hazard and a negative impact on human health since benzene is a known human carcinogen.

Accordingly, vapor losses from fixed-roof gasoline storage tanks includes displacement losses caused by inflow of liquid, breathing losses caused by temperature and atmospheric pressure variations, and emptying losses caused by evaporation of liquid after the transfer of product occurring during the interval between the next product delivery.

Capture of displacement losses in the United States petroleum industry has been addressed by Stage I, Stage II and ORVR vapor recovery systems. The Stage I systems return vapors displaced from the large capacity storage tanks to the ullage space of the high volume tanker truck. Stage II systems return vapors displaced from vehicle fuel tanks to the storage tanks, and ORVR (On-board refueling Vapor Recovery) systems capture vapors displaced from vehicle fuel tanks within a canister, located within the vehicle, containing selectively adsorbent material.

The overall vapor recovery efficiency at the refueling station depends upon the vapor emissions at the nozzle/automobile fillpipe interface and on the vapor emissions from the storage tanks both during and in the interval between bulk product deliveries. In addition, other factors such as liquid spillage must be taken into account. In conjunction with FIG. 5, the following equations apply:

$$E(UNC)=E(R\mathbf{1})+E(V\mathbf{1})+E(F\mathbf{1})+E(SL\mathbf{1}) \quad (1)$$

$$E(C)=E(R\mathbf{2})+E(V\mathbf{2})+E(F\mathbf{2})+E(SL\mathbf{2}) \quad (2)$$

where;

$$\text{Efficiency } (n)=(E(UNC)-E(C))/E(UNC)\times 100\% \quad (3)$$

$E_{UNC}$=Total Uncontrolled Emissions from a petrol filling station using Stage I vapor recovery, but no Stage II and open vent lines, $E_{R1}$=Uncontrolled refueling emissions from vehicle tank $E_{V1}$=Measured vapor emissions expelled from manifolded storage tank vent lines. These losses include tank breathing losses caused by atmospheric pressure variations, wet-stock evaporative losses caused by air ingestion and excess vapor volumes developed during a bulk drop, even with Stage I vapor balance piping installed.

$E_{F1}$=Fugitive emissions expelled from the combined vapor space of the petrol station storage tank and delivery piping system. These emissions occur in the vapor space before reaching the vent. Fugitive emissions can be estimated by conducting a pressure decay test on the enclosed vapor space of the storage tank and vapor piping system.

$E_{SL1}$=Spillage emissions are caused by liquid product dripping from nozzles and nozzle/fillpipe interface The equation describing the losses after control measures are installed is as follows:

$$E_C=E_{R2}+E_{V2}+E_{F2}+E_{SL2};\text{ where} \quad (4)$$

$E_{R2}$=Vehicle refueling emissions measured at the nozzle/fillpipe interface after the installation of Stage II vapor recovery systems which allow the return of vapors displaced from the vehicle fuel tank to the petrol stations storage tanks.

$E_{V2}$=Measured vapor emissions at storage tank vent lines which are manifolded and are kept closed by the use of a pressure/vacuum valve ("p/v"). The p/v valve provides for a slight increase in Stage I collection efficiency and allows for the establishment of a small positive or negative pressure on the entire vapor space. All measured vapors expelled from the valve or valves must be included in the emissions inventory; this includes tank breathing losses, wet-stock evaporative losses and the vapors expelled during bulk tanker drops, even with Stage I balance piping installed. If processing units are installed on the manifolded vent lines, the exhaust lines of the units must be measured for vapor emissions and included in EV2.

$E_{F2}$=Fugitive emissions are calculated in the same manner as previously described for uncontrolled sites.

$E_{SL2}$=Spilled liquid emissions are estimated from published figures unless other lower parameters can be proved.

As seen in the above equations, the key parameters which must be measured are EV1, ER2 and EV2 (ER1 is assumed relatively constant while EF1, EF2, ESL1 and ESL2 are smaller contributors—see Table 1 in the Appendix for listing of typical figures for these parameters).

Historically, the focus has been on systems or piping configurations which capture vapors and systems designed to ensure containment of the captured vapors and mitigate breathing and emptying losses from storage tanks located at dispensing facilities have not been widely discussed or pursued. This focus has recently changed since newly promulgated Enhanced Vapor Recovery (EVR) regulations by the California Air Resources Board (CARB) are scheduled to take effect by April 2003. In addition, the San Diego Air Pollution Control District (APCD) is presently investigating in detail various loss modes in the storage and transfer of petroleum liquids. Moreover, NESCAUM (Northeast States for Coordinated Air Use Management) has recently asked the USEPA to accurately measure storage tank vapor emissions.

The lack of attention to these loss modes can be largely attributed to loss factors quantified in a Journal article published in 1963, Chass, R. L., et al., "Emissions from Underground Gasoline Storage Tanks", J. Air Pollution Control Association, 13 (11), 524–530. The relatively small figures of 1 pound of hydrocarbon evaporated for every 1,000 gallons of fuel dispensed have been recently challenged. The author's research has consistently measured and modeled a figure of at least 8 pounds of hydrocarbons evaporated for every 1,000 gallons of fuel dispensed. A recent study in Australia reports a figure of approximately 28 pounds of HC per 1,000 gallons dispensed, and a recent analysis done on a Chevron-Texaco site in the USA yielded an even higher figure.

The above mentioned CARB regulations require certain refinements to existing hardware and monitoring methods to meet the new EVR standards. One technique involves the use of a selectively permeable membrane to reduce EV1, EV2, EF1, and EF2 emissions (see U.S. Pat. No. 6,059,856, "Method and Apparatus for Reducing Emissions from Breather Lines of Storage Tanks," describing the use of a GKSS membrane). It should be noted that even without the recent regulatory requirements, the installation of a selectively permeable membrane system on the combined ullage space of storage tanks yields attractive economic returns to the party that owns the gasoline in the storage tanks.

A major concern among regulators and petroleum marketers alike is ensuring that numerous installed vapor recovery systems are performing effectively over an on-going, continuous interval. Coupled with this concern is the need for confidence in the storage tank system integrity—in terms of both vapor and liquid containment. To achieve the latter objectives, petroleum marketers have made substantial investments in storage tank and product line leak detection systems, Automatic Tank Gauges (ATG's) and Statistical Inventory Reconciliation (SIR) algorithms. Ostensibly, these hardware devices and software algorithms appear effective in meeting the above needs. However, upon closer examination, the existing products and services suffer serious flaws.

The key governing equation for storage tank systems is as follows:

$$\text{INPUT}-\text{OUTPUT}=\text{ACCUMULATION} \qquad (5)$$

If the owner or operator of a gasoline refueling station is confident that liquid leaks are not present, the other means of apparent or measured loss of mass are through evaporation loss, meter miscalibration, invoice errors, theft or volumetric changes due to temperature variation. Variations of these techniques are presently approved by USEPA for tank monitoring protocols designed to detect liquid leaks and thereby avoid major environmental spills and their associated costly remediation.

However, for the material balance to generate accurate results, temperature compensation is necessary to avoid significant calculation errors caused by volume growth or contraction of liquid gasoline. It is known in the art that typical gasoline blends experience a volume change of approximately 0.70% upon undergoing a temperature change of 10 F. A consistent and accurate inventory balance can also provide the refueling site owner/operator with an extra level of confidence that liquid leaks are not being masked by volume expansion of liquid gasoline. Moreover, this technique will allow for continuous verification that the vapor recovery system, liquid leak detection system and associated diagnostic monitors are working properly. Without temperature compensation and isolation of inventory discrepancies, one can never be sure if inventory shortfalls or gains are the result of liquid leaks, meter inaccuracies, theft, product evaporation or invoicing errors from the wholesaler. The algorithms presently used by most SIR service providers do not typically isolate individual components of inventory variation. In fact, USEPA regulations allow up to 1%+130 gallons unexplained variation in inventory reconciliation. For a site with throughput of 2 million gallons per year, this discrepancy totals 20,000 gallons, or 3 full tanker trucks per year. Considering aggregate United States gasoline average annual consumption of 130 billion gallons via approximately 170,000 dispensing facilities, these unexplained losses total 1.322 billion gallons. Viewed in another manner, this quantity of fuel represents 220,350 full tanker trucks. If parked end-to-end, this line of bulk tanker trucks would stretch from Chicago to San Francisco.

To ensure efficient, on-going vapor recovery and containment system performance within prescribed confidence intervals, various techniques have been proposed, with similar fundamental characteristics and associated shortcomings. U.S. Pat. No. 5,860,457 (Andersson), proposes measuring the flow of a mixture of air and gasoline from a vehicle tank and then determining the density of the gasoline vapor in the mixture. A variable flow valve is proposed to vary flow of the mixture based on vapor density. If such a technique is employed, it seems clear from FIG. 5 and equations (3) and (4) that ER2 and EV2 will increase, and the overall recovery efficiency will be proportionally reduced. In a similar manner, U.S. Pat. No. 6,240,982 (Bonne), proposes a variable vapor return rate contingent upon atmospheric temperature conditions. Again, if ER2 and EV2 are increased, overall recovery efficiency will decline.

Pending U.S. applications by Pope, 20010004909, Nanaji, 20010020493 and Hart, 20010039978, disclose the use of various sensors to measure flow and/or hydrocarbon concentration in various vapor pathways connected to the storage tank system. The similar thread of measuring an air to liquid (A/L) or vapor to liquid (V/L) ratio are disclosed. The shortcomings of such an approach are numerous. Among the primary limitations are the following: (1) to calculate an overall vapor recovery efficiency, ER2 must be measured. These techniques only seek to measure a V/L or A/L ratio. ER2 is a mass, not a volumetric flow rate. (2) the V/L or A/L ratio and corresponding HC concentrations are not constant values throughout the refueling event. In order to record accurate results, one would need extremely high sampling rate to record changes of both flow rate and hydrocarbon concentration with time. Also, time lag in measuring the data presents problems with correlating proper flow and HC concentration values (Mass=flow×HC Concentration). (3) V/L and A/L ratios show only that air or vapors are being transferred to the storage tank, but no additional information on the storage tank environment is provided. (4) the "L" value is liquid flow rate determined by dispenser meters which are not temperature compensated, thus introducing a volumetric error even before associated HC masses are tabulated. (5) The "A" or "V" values are volumetric flow rates of air or hydrocarbon/air mixtures which vary in both temperature and concentration, introducing additional measurement errors. (6) Impact of ORVR equipped vehicles on returned flow rates is uncertain. (7)

The assumption of a properly functioning vapor recovery system operating at an A/L ratio of 1:1 is not valid. The vapor generation rate is a function of RVP, temperature, altitude, ORVR population, and ORVR design type. Measured figures have been shown to exceed a 1:1 ratio by a large margin.

The present invention provides a real-time system for detecting leaks from product tanks due to evaporation, volume discrepancies from flow meters out of calibration, improperly functioning vapor recovery equipment and other irregularities.

The method of the invention also identifies system anomalies to a specific storage tank to accelerate any subsequent investigative procedures. The storage tank discrepancy can be further partitioned to identify a malfunctioning fueling point or specific nozzle.

The system of the invention remotely monitors storage tanks to maximize usage, prevent overflow, and ensure EPA compliance. The system also employs the data to generate the overall material balance for the site.

The system is adapted to remotely monitor proper operation of processor systems designed to mitigate evaporative losses and subsequent storage tank pressurization by logging critical variables and maintaining historical logs for CARB, EPA and local air quality enforcement organization inspection.

The system maintains historical logs which provide a documented record of saved product volumes; such volumes may form the basis for certain processor system payment options.

The system notifies maintenance and on-site personnel via alarms, pager, e-mail, phone, fax, or the like, if system anomalies are recorded.

The system sends local site data to regional or national data warehouses for management reporting, trend analysis and regulatory compliance verification.

Finally, the system logs performance data of processor and other systems to predict preventive maintenance schedules.

Accordingly, a continuing and heretofore unaddressed need exists for a gasoline vapor recovery, containment and monitoring methodology wherein the above discussed problems associated with verifying vapor collection efficiency from the tanker truck and nozzle/automobile fillpipe are minimized, short-comings of complicated and expensive sensors to monitor V/L, A/L and HC concentrations are eliminated, and lack of confidence in storage tank system integrity and expensive investigative procedures for both vapor and liquid containment are eliminated. In addition, there is a need for a system that can interface with existing equipment capable of serial communication and can be installed at existing service stations with a minimum amount of disruption to commerce.

SUMMARY OF THE INVENTION

Briefly described, the present invention comprises a method of transforming an "open" gasoline storage and transfer system to a "closed" system. The method includes providing a selectively permeable membrane processor on the combined storage tank ullage space in conjunction with the installation of a p/v valve on the combined storage tank vent lines. The normal vent to atmosphere is fitted with the p/v valve such that the storage tank system becomes a closed system, sealed off from the atmosphere. A pressure sensor is installed to measure and monitor the pressure differential between the combined storage tank ullage and prevailing atmospheric pressure. When the pressure differential reaches a prescribed value, the membrane processor is actuated to exhaust to the atmosphere air which has been depleted of hydrocarbons and return vapors, enriched with hydrocarbons to the combined ullage space.

In order to ensure proper operation of the vapor recovery and containment system as well as storage tank system integrity, two techniques can be employed. First a statistical inventory reconciliation (SIR) technique is employed which uses trend smoothing and statistics to isolate specific inventory variations in the distribution chain such as evaporative losses in transit and storage, terminal meter variation, dispenser meter variation, and temperature variation.

If the SIR technique indicates an inventory variation in a particular storage tank, which falls outside of prescribed statistical limits, then a mass integrity test such as that offered by Masstech International, Ltd of the United Kingdom is employed to ensure that the specific storage tank identified for further investigation has both liquid and vapor storage integrity; in other words, no liquid or vapor leaks are present. These techniques are well known in the art, but their use in conjunction with an overall material balance is unique and valuable.

The inventory reconciliation is carried out by accessing volumetric data from a given refueling site by conducting reconciliation calculations on each individual storage tank employed at the site. This volumetric data includes gasoline dispensed, delivered, and opening and closing inventory levels in the each tank. Temperature variations are important since a 10 F change will result in a 0.7% change in gasoline volume. Without a common temperature basis, temperature variation can mask evaporative losses and/or liquid leaks. These data are obtained by presently existing hardware used in the dispenser, POS (point-of-sale) and ATG systems such as those provided by Incon (Franklin Fueling Systems), EBW (Franklin Fueling Systems), Emco Electronics (Dover Resources) and Veeder-Root (Danaher).

The combination of membrane based vapor processor hardware, a trend smoothed temperature compensated inventory reconciliation algorithm, tank, and line leak detection techniques will provide a continuous, on-going diagnostic of vapor recovery system performance as well as ensuring storage tank system integrity relative to vapor and liquid containment. As such, costly, cumbersome, inaccurate and maintenance intensive flow and concentration sensors are not required by petroleum marketers. A direct linkage is established between storage tank, interconnection piping leak detection, statistical inventory reconciliation, bulk tanker vapor recovery, vehicle vapor recovery system performance and storage tank vapor containment processor system performance. Each component is a key contributor to the overall integrated vapor recovery and containment at a given refueling site.

This technique is especially valuable since system upsets or anomalies will manifest themselves by disrupting the fundamental overall material balance and observed differential pressure profile. If inventory variations from a median value are greater than a statistically derived standard deviation, additional investigative procedures can be undertaken to determine the primary failure mode of the integrated storage tank and delivery system. This technique is especially powerful since system anomalies are rapidly isolated and pinpointed to a specific storage tank at a given refueling site.

The integrity of the overall system is further enhanced by the use of a pressure monitor on the combined storage tank ullage and on the permeate vacuum pump. Also, cumulative run time of the vacuum pump motor is recorded. In addition to logging and reporting process conditions via various communication systems, such as via local or internet protocols, the system can be configured to automatically initiate predetermined safety measures such as shutting down dispenser pumps, sending emails or other types of alerts to service technicians, and actuating audible or visual alarms at the site. Such an approach leverages the value of presently required methods and enables the petroleum marketer to earn an economic return while at the same time taking steps favorable to the environment. Another commercial advantage earned by petroleum marketers is the flexibility and vendor options provided by such an approach.

DESCRIPTION OF DRAWINGS

Figure 4:
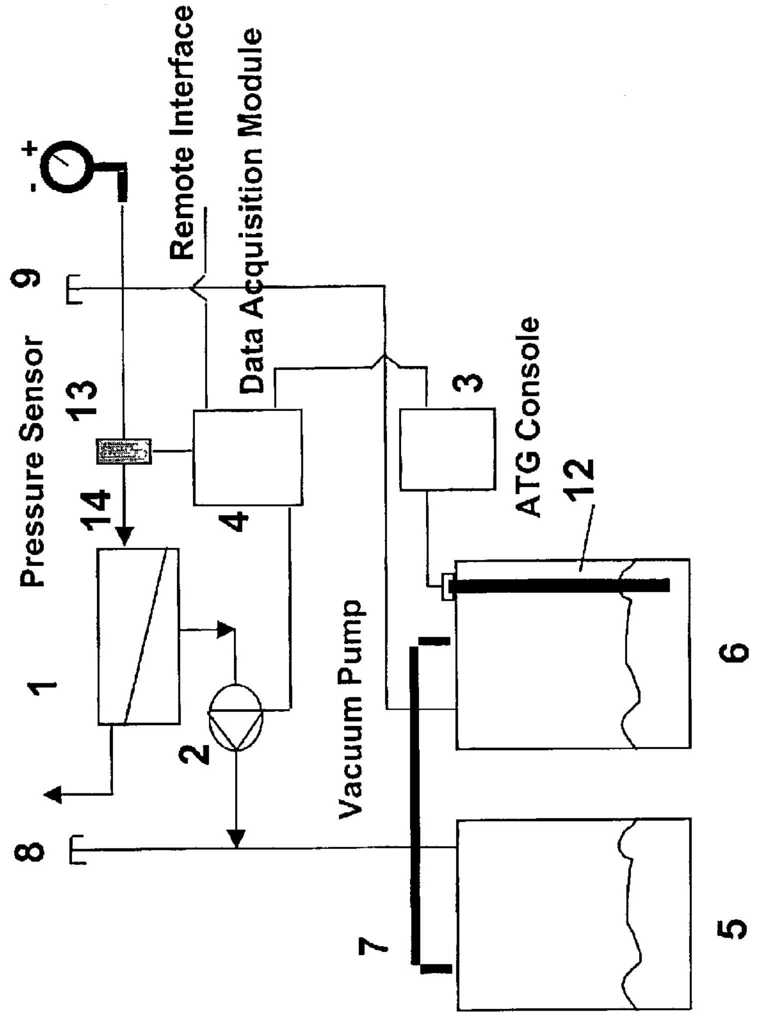
FIG. 4 illustrates a first embodiment of a refueling station of the invention.
Figure 5:
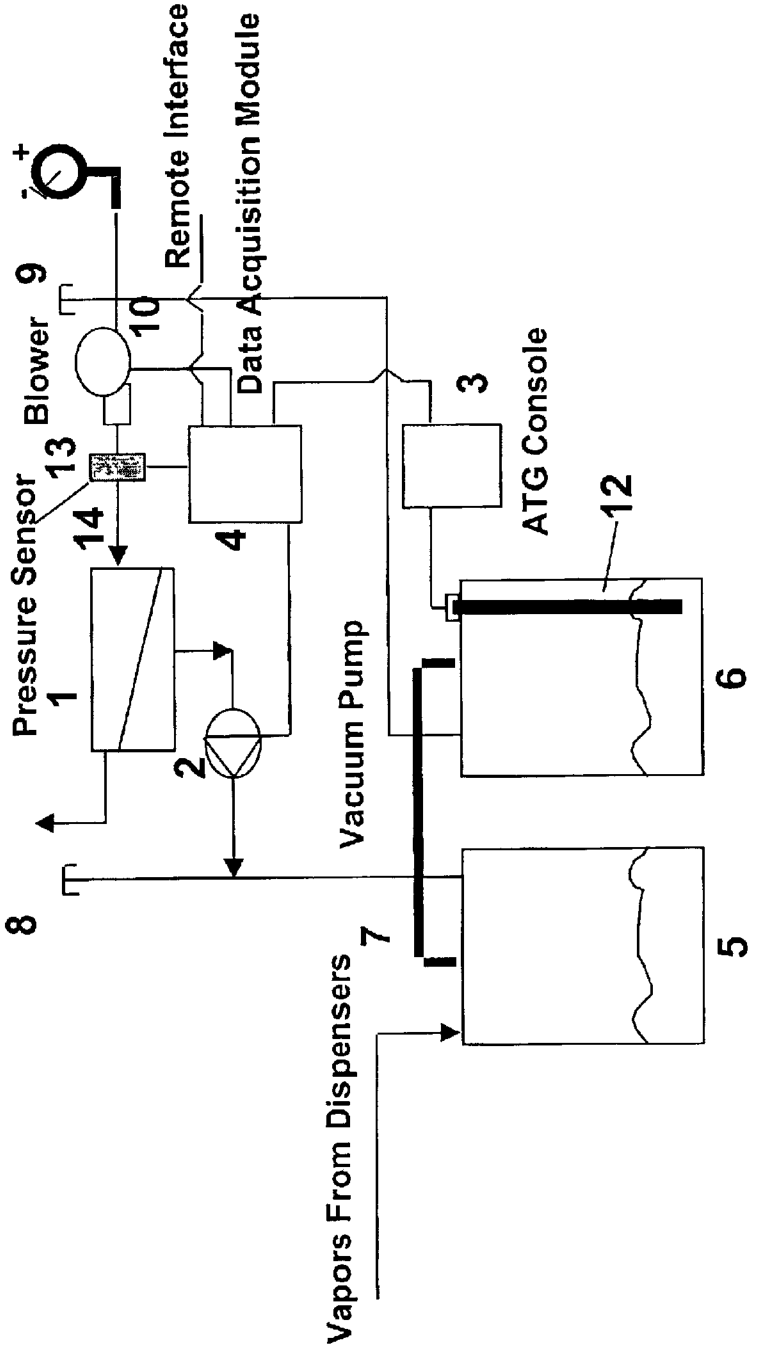
FIG. 5 illustrates a second embodiment of a refueling station of the invention.
Figure 6:
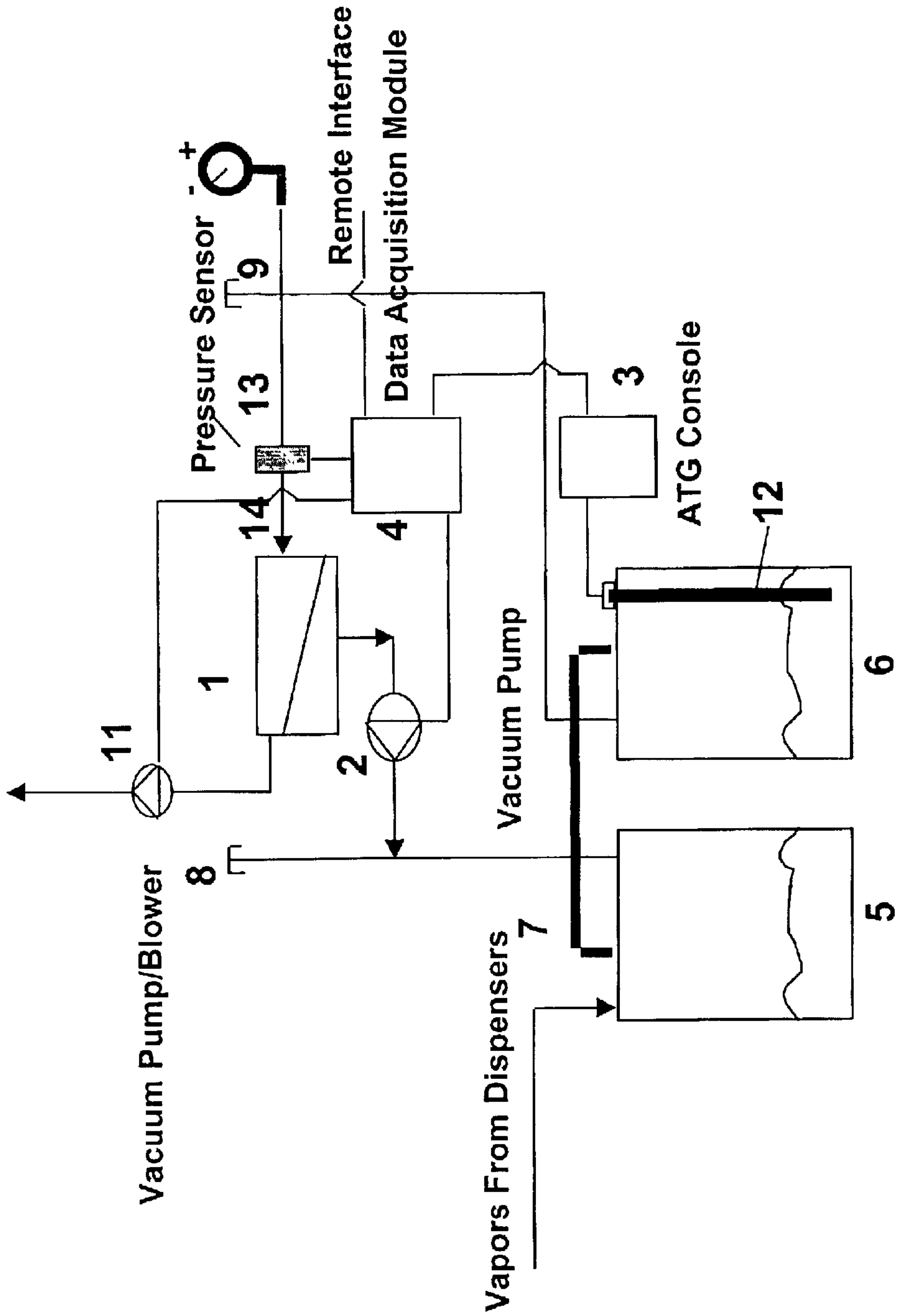
FIG. 6 illustrates a third embodiment of a refueling station of the invention.

As seen in FIGS. 4–6, a refueling station storage tank system is equipped with a membrane system (1), a vacuum pump (2), an ATG console (3) and a data acquisition module (4). Two storage tanks (5) and (6) are shown. The selectively permeable membrane (1) was referenced previously and is shown connected to the combined vapor space or "ullage" of tanks (5) and (6). Tanks (5) and (6) are shown with their ullage spaces connected by conduit (7). (The figures show the tanks manifolded underground with individual vent lines; other piping combinations are contemplated as well). The combined ullage space is kept closed by the installation of p/v valves (8) and (9). In the United States, these valves have a typical setting of +3 inches water column and −8 inches water column. Such valves are commercially available from suppliers such as Husky, Hazlett Engineering and OPW Fueling Components. Also note in FIGS. 5 and 6 is a "front-end" vehicle vapor recovery system commonly known as a Stage II vapor recovery system. This system may be a balance system, or dispenser based vacuum assisted system provided by companies such as Tokheim, Gilbarco and Dresser/Wayne. As seen in FIGS. 5 and 6, the Stage II vapor recovery system returns vapors recovered during vehicle refueling to storage tank (5).

The system shown in FIG. 4 uses the developed ullage tank pressure to actuate and feed the membrane system as shown. The system shown in FIG. 5 employs a blower (10) on the feed stream of the membrane to allow the ullage pressure to be driven below prevailing atmospheric pressure. The system shown in FIG. 6 uses a vacuum pump or blower (11) on the exhaust side of the membrane to allow for drawing the ullage pressure below prevailing atmospheric pressure. In FIGS. 4–6, the ATG (automatic tank gauge) probe (12) and console (3) are shown. The tank probe is shown only in one storage tank for clarity, but in practice, each tank is equipped with such a probe. Also in FIGS. 4–6, the combined ullage pressure sensor (13) is shown connected to the feed side of the membrane (14) and the data acquisition module (4).

Figure 1:
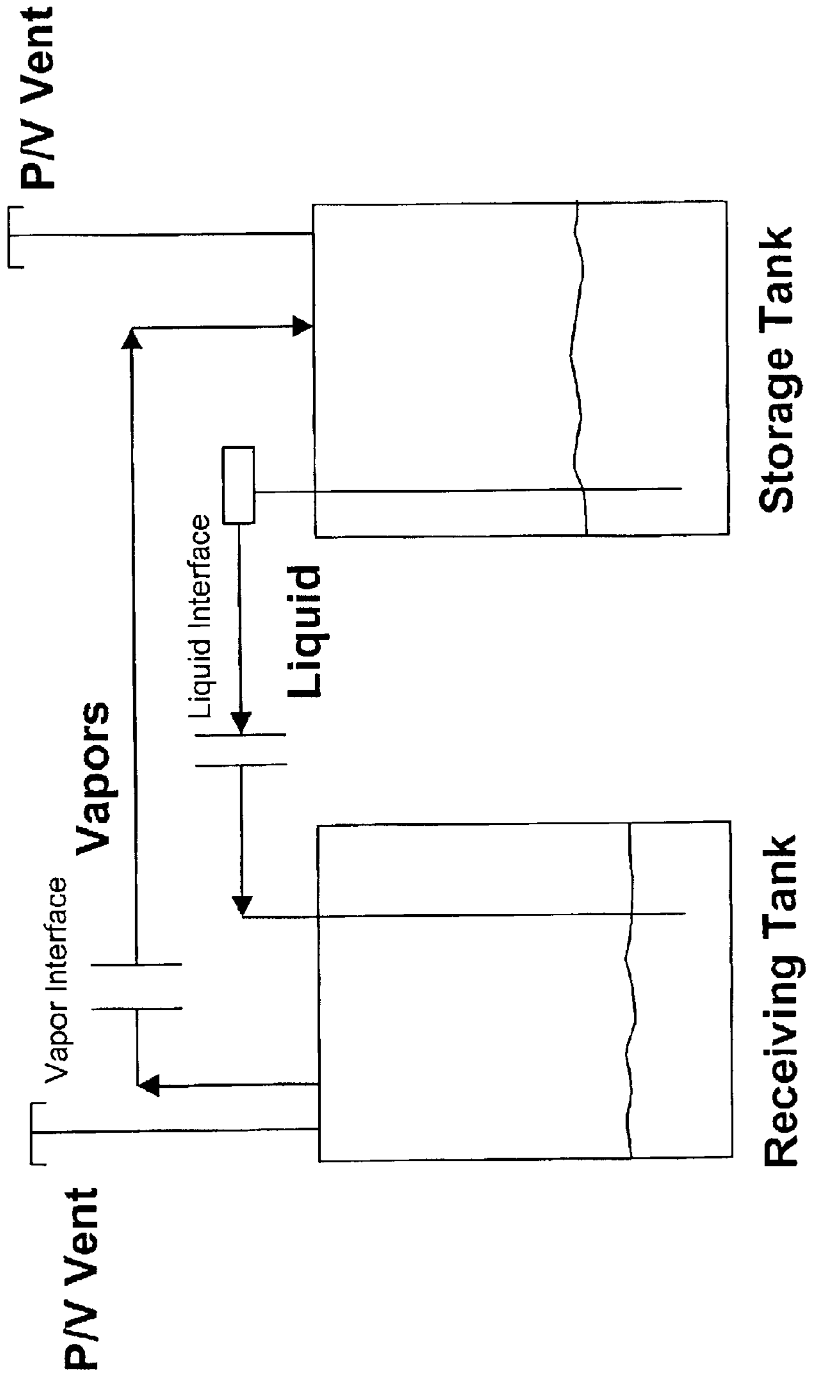
FIG. 1 illustrates a typical refueling station arrangement including liquid and vapor interface.
Figure 2:
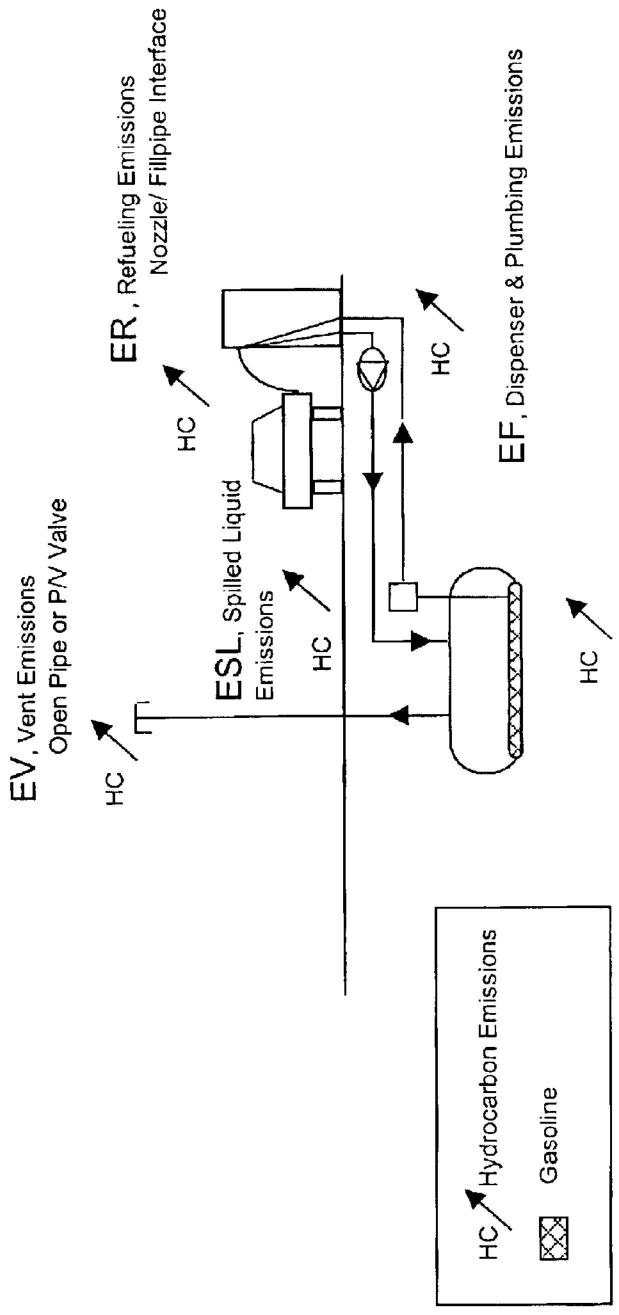
FIG. 2 illustrates the various emission points associated with a refueling station.
Figure 3:
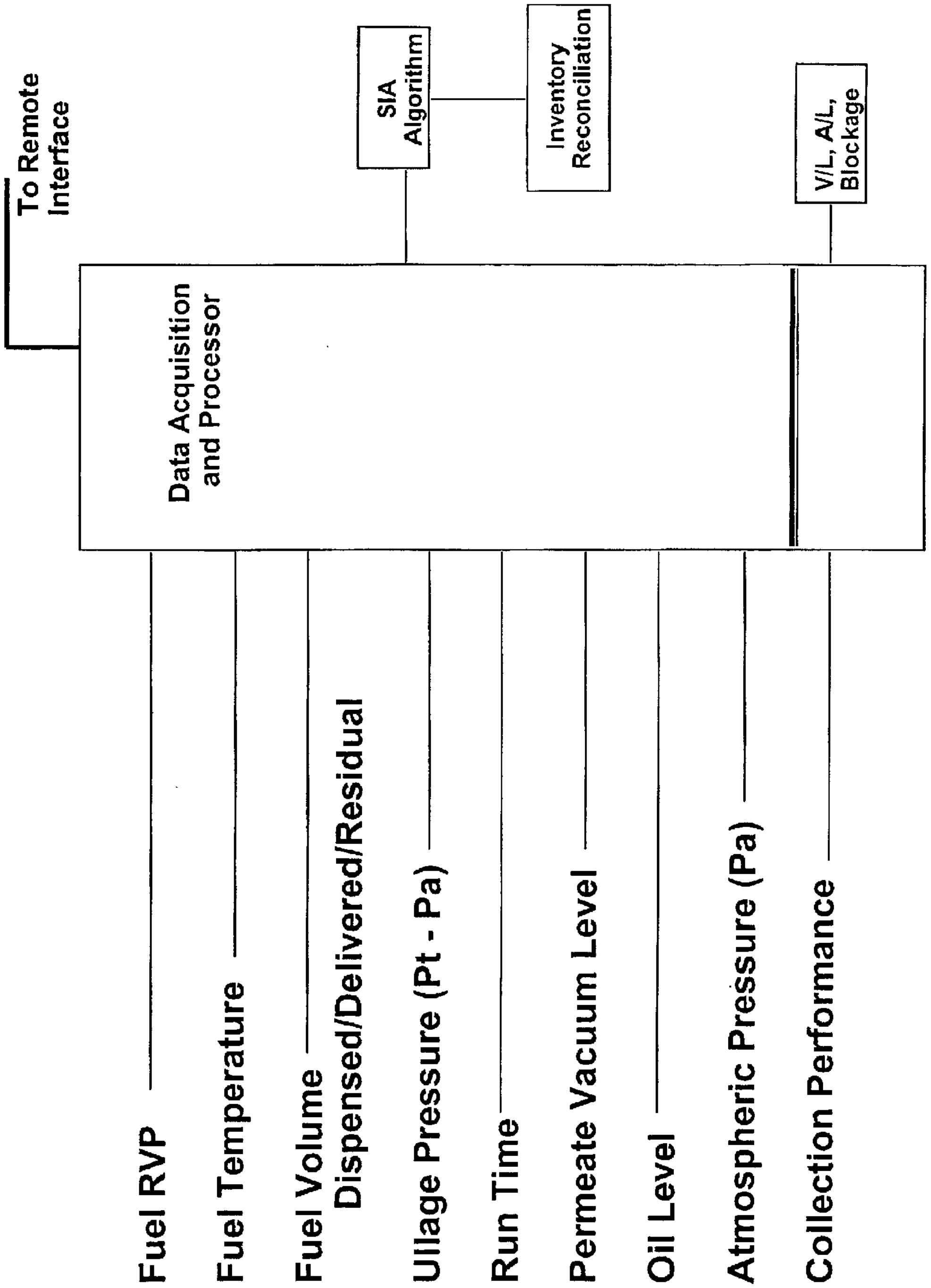
FIG. 3 illustrates a control processor and associated data in accordance with the invention.

FIG. 3 schematically depicts the inputs to the data acquisition and processing system as well as the output decision logic of the subject invention. Dispensed and delivered volumes are tracked from dispenser meters, automatic tank gauge systems and/or delivery manifests. Residual tank levels are quantified by manual sticking or electronic tank gauges. These readings make up the raw data inputs for a trend-smoothed statistical inventory reconciliation technique such as that employed by various statistical techniques, such as the RedOne algorithm employed by Leighton O'Brien of Melbourne Australia. The trend smoothed data is analyzed on a continuous basis (perhaps monthly) to ensure that discrepancies do not exceed an acceptable range. At the same time, simple parameters are monitored, logged and remotely accessed to ensure proper operation of a vapor processor, such as a membrane based system. The critical variables are combined ullage differential pressure relative to atmosphere; permeate vacuum pump level, altitude, cumulative run time on vacuum pump motor, and atmospheric pressure.

These variables are continuously measured, logged and recorded to provide an on-going operating history of the system dynamics. With proper operation, one would expect storage tank pressures never to exceed the UCL (Upper Control Limit) of the membrane processing system. Also, while the storage tank pressure is being reduced, the permeate vacuum level should register a value within an acceptable band and the cumulative run time meter should also show an increase. The combination of these variables with the inventory reconciliation provides a reliable, simple technique for ensuring efficient and effective operation of the vapor recovery and containment system.

As seen in FIG. 3, the typical inputs and output of the data acquisition system show the raw data and calculated trend loss for a refueling site. So called trigger values are set based on RVP and temperature conditions for a given site. If these values are approached or exceeded, a loss investigation procedure is recommended to ensure that a liquid leak is not present. Alarms will be actuated, and depending on the severity of the anomaly, fueling operations will be interrupted for a short period of time until appropriate actions are taken by on-site or off-site personnel in acknowledging the upset and taking corrective measures.

Although the specification and illustrations of the invention contain many particulars, these should not be construed as limiting the scope of the invention but as merely providing an illustration of some of the preferred embodiments of the invention. Thus, one skilled in the art should interpret the claims as encompassing all features of patentable novelty that reside in the present inventions, including all features that would be treated as equivalents by those skilled in the art.

What is claimed is:

1. A data monitoring system for monitoring vapor recovery and containment in a liquid fuel dispensing facility, the facility including at least one liquid fuel fixed roof storage tank and at least one liquid fuel fixed roof receiving tank and at least one fuel transfer interface coupled to at least one liquid fuel storage tank and receiving tank, the system comprising:

a data processing unit configured to receive, transmit and perform mathematical operations on information relating to said fuel dispensing facility, the data processing unit monitors and assesses vapor collection performance by conducting a statistical analysis on sensor data;

a plurality of sensor elements electronically coupled to said data processing unit to provide data relating to said fuel dispensing facility; and a control unit, the control unit coupled to said data processing unit and to a communication link of said fuel dispensing facility, the control unit providing inferences relating to the condition of the monitored system by reference to data provided by said data processing unit.

2. The system of claim 1, wherein the sensor provided data is selected from a group comprising fuel storage tank temperature, fuel RVP, dispensed volumes, delivered volumes, beginning and ending inventory levels, altitude and atmospheric pressure.

3. The system of claim 1, further comprising a vapor transfer conduit and interface in communication with at least one liquid fuel storage tank and receiving tank.

4. The system of claim 3, wherein said data processing unit monitors and assesses the vapor collection performance of the vapor transfer interface.

5. The system of claim 4, wherein the vapor collection performance is monitored and assessed by measuring the pressure differential from at least two points located along a vapor flow path between a dispensing nozzle and the underground storage tank.

6. The system of claim 4, wherein the vapor collection performance is monitored and assessed by quantifying the vapor volume returned divided by liquid volume dispensed ratio.

7. The system of claim 4, wherein the vapor collection performance is monitored and assessed by quantifying the air volume returned divided by liquid volume dispensed ratio.

8. The system of claim 1, wherein the control unit further generates a report listing the daily, weekly and monthly storage tank ullage pressure and vapor collection and containment assessments.

9. The system of claim 1, wherein the control unit confirms vapor collection and containment performance by calculating a statistically smoothed inventory reconciliation based on the fundamental overall mass balance of IN−OUT=ACCUMULATION, and wherein if cumulative excess or shortfall volumes within a given time period are within a statistically calculated range, suitable performance is ensured, and further wherein if figures fall outside of such a range, a loss investigation procedure is initiated, system alarms are actuated and fuel dispensing is disabled.

10. A data monitoring system for monitoring vapor recovery and containment in a liquid fuel dispensing facility, the facility including at least one liquid fuel fixed roof storage tank and at least one liquid fuel fixed roof receiving tank and at least one fuel transfer interface coupled to at least one liquid fuel storage tank and receiving tank, the system, comprising:

a data processing unit configured to receive, transmit and perform mathematical operations on information relating to said fuel dispensing facility, the data processing unit further monitors and assesses vapor collection performance by conducting a statistical analysis on combined ullage differential pressure versus time profile, when pressure profile decreases are observed during vehicle refueling, the data processing unit provides an indication to the control unit that vapor return rates are less than adequate;

a plurality of sensor elements electronically coupled to said data processing unit to provide data relating to said fuel dispensing facility; and a control unit, the control unit coupled to said data processing unit and to a communication link of said fuel dispensing facility, the control unit providing inferences relating to the condition of the monitored system by reference to data provided by said data processing unit.

11. The system of claim 1, wherein the system is combined with pressure/vacuum relief vents to establish a closed system sealed off from direct contact with the surrounding atmosphere.

12. The system of claim 11, wherein said processing unit and said control unit are comprised of various technologies including combustion, catalytic oxidation, activated carbon, plasma processing, UV and membrane based systems.

13. A data monitoring system for monitoring vapor recovery and containment in a liquid fuel dispensing facility, the facility including at least one liquid fuel fixed roof storage tank and at least one liquid fuel fixed roof receiving tank and at least one fuel transfer interface coupled to at least one liquid fuel storage tank and receiving tank, the system, comprising:

a data processing unit configured to receive, transmit and perform mathematical operations on information relating to said fuel dispensing facility;

a plurality of sensor elements electronically coupled to said data processing unit to provide data relating to said fuel dispensing facility;

a control unit, the control unit coupled to said data processing unit and to a communication link of said fuel dispensing facility, the control unit providing inferences relating to the condition of the monitored system by reference to data provided by said data processing unit; and wherein the system is a membrane based system where the input data received by the plurality of sensors in the membrane unit results in vapors being directed from at least one vapor space in communication with the storage tank ullage, wherein rich vapor is directed back to the storage tank ullage and the air exhaust stream is directed to the atmosphere.

14. The system of claim 13, wherein the system further includes a pump located on a permeate side of the membrane as well as on the retentate side of the membrane, and wherein the monitored data further includes vacuum pump motor run time, permeate vacuum level, and oil level limit threshold in a pump exhaust box.

* * * * *